(12) United States Patent
Ifield

(10) Patent No.: US 8,893,857 B2
(45) Date of Patent: Nov. 25, 2014

(54) METHOD AND APPARATUS FOR PURGING AIR FROM AUTOMATIC LUBRICATION SYSTEMS

(75) Inventor: Benjamin Ifield, Middle Dural (AU)

(73) Assignee: Bob Ifield Holding Pty Ltd., Middle Dural, NSW (AU)

( * ) Notice: Subject to any disclaimer, the term of this patent is extended or adjusted under 35 U.S.C. 154(b) by 539 days.

(21) Appl. No.: 13/058,480

(22) PCT Filed: Aug. 13, 2009

(86) PCT No.: PCT/AU2009/001040
§ 371 (c)(1),
(2), (4) Date: Feb. 10, 2011

(87) PCT Pub. No.: WO2010/017593
PCT Pub. Date: Feb. 18, 2010

(65) Prior Publication Data
US 2011/0132687 A1 Jun. 9, 2011

(30) Foreign Application Priority Data
Aug. 13, 2008 (AU) .............................. 2008904126

(51) Int. Cl.
| F16N 7/38 | (2006.01) |
| F16N 29/02 | (2006.01) |
| F16N 29/04 | (2006.01) |
| F16N 13/00 | (2006.01) |
| F16N 11/00 | (2006.01) |
| F16N 37/00 | (2006.01) |
| F16N 31/00 | (2006.01) |
| F16N 11/10 | (2006.01) |
| F16N 39/00 | (2006.01) |

(52) U.S. Cl.
CPC .............. *F16N 39/002* (2013.01); *F16N 11/10* (2013.01)
USPC ........................................................ 184/6.23

(58) Field of Classification Search
USPC .................................................. 184/7.4, 6.23
See application file for complete search history.

(56) References Cited

U.S. PATENT DOCUMENTS

| 3,081,788 A | 3/1963 | Lewis |
| 3,807,424 A * | 4/1974 | Grantham et al. ............ 137/106 |
| 4,312,425 A * | 1/1982 | Snow et al. .................... 184/7.4 |

(Continued)

FOREIGN PATENT DOCUMENTS

EP 1790903 A1 5/2007

OTHER PUBLICATIONS

International Search Report dated Nov. 23, 2009 from corresponding PCT/AU2009/001040 application, 3 pages.

*Primary Examiner* — William E Dondero
*Assistant Examiner* — Mark K Buse
(74) *Attorney, Agent, or Firm* — Maier & Maier, PLLC

(57) ABSTRACT

An automatic lubrication system where grease is dispensed to injectors from a pump having a grease piston (42) reciprocated by a connecting rod from an oil piston (43) driven by alternating hydraulic pressure, is provided with air purge valves (41) associated with each injector. The air purge valves detect abnormal operation of the piston movement due to air in the grease by way of indicators (45) and (46) communicating with chambers in the pump, and open the air purge valve to dump air laden grease into a recovery reservoir (48). A sensor in the air purge valve warns the operator of purge valve operation, alerting the operator to a possible system malfunction.

21 Claims, 7 Drawing Sheets

(56) References Cited

U.S. PATENT DOCUMENTS

| | | |
|---|---|---|
| 4,537,164 A | 8/1985 | Ajiki et al. |
| 4,712,649 A | 12/1987 | Saam |
| 4,754,848 A | 7/1988 | Azzopardi et al. |
| 5,041,990 A * | 8/1991 | Yabumoto et al. ............ 702/24 |
| 5,297,511 A | 3/1994 | Suzuki |
| 6,053,285 A * | 4/2000 | Reeves ........................ 184/6.23 |
| 6,655,922 B1 | 12/2003 | Flek |
| 7,118,352 B2 | 10/2006 | Gruett et al. |
| 2007/0119657 A1* | 5/2007 | Urata et al. ................. 184/6.23 |

* cited by examiner

METHOD AND APPARATUS FOR PURGING AIR FROM AUTOMATIC LUBRICATION SYSTEMS

RELATED APPLICATIONS

This application claims priority, under 35 U.S.C.§119, to International Patent Application No. PCT/AU2009/001040, filed on Aug. 13, 2009, which claims priority to Australian Patent Application No.: 2008904126, filed Aug. 13, 2008, the disclosures of which are incorporated by reference herein their entireties.

FIELD OF THE INVENTION

This invention relates to a method and apparatus for purging air from automatic lubrication systems by providing a valve to purge air or gas from lubricant before it is delivered to machinery bearings, and has been devised particularly though not solely for use in heavy machinery of the type used in mining or earth moving.

BACKGROUND OF THE INVENTION

Automatic lubrication systems are used on many types of machinery, from large fixed plant to smaller mobile construction and mining equipment. In general they replace procedures requiring manual application using grease guns and the like.

Throughout this specification the lubricant is referred to as grease, being the most common lubrication substance, but the term is to be understood to include other lubricants such as oil and synthetic liquids or gels.

Known automatic centralised lubrication systems provide a useful function, but have some problems. It is not necessarily obvious to the machine operator when the automatic lubrication system is not delivering grease to all the bearings, due to some malfunction of the lubrication system. For example a broken connecting line can simply allow the full grease charge to be wasted, with none going to the injectors, or a malfunctioning injector can starve one bearing of lubricant. More sophisticated systems have alarms and sensors to provide oversight of operation, often in combination with an electronic sentry system, but such equipment is often not compatible with mining, earth moving and construction equipment as being too unreliable in the harsh environment in which these machines operate.

Malfunction of the lubrication system can be caused by air entrained in the grease in a reservoir. All greases are viscous, by definition, and release air reluctantly. Many greases are formulated as a stiff gel that effectively does not release air at all. Air may be entrained in the grease in many ways including:

When the system reservoir is recharged:
There may be air in the hoses connecting to the filling system;
Air may be pumped in when the drum of grease becomes emptied:
The suction spear may not protrude far enough into the grease in the drum so that a mixture of air is drawn in:
There may be an air leak in the suction of the filling system:
Or the grease may have air entrained in the drum as delivered.

With more fluid greases, an air bleed can assist in removing air from the reservoir. Some pump systems use a reservoir without a follower piston and a motor driven paddle to assist in mobilising the grease to the pump inlet that will also assist in air release with some greases, but this does not always effectively bleed the air.

The effectiveness of the lubrication system can be severely reduced by air. The grease in the pump becomes compressible so that less grease is delivered, or in some cases none at all. The delivery line effectively becomes a hydraulic accumulator as the air in the line becomes compressed and presents a potential safety hazard. Grease that is delivered to the bearings may be aerated, reducing the lubrication effectiveness.

Once air is distributed through the lubrication system often the only recourse is to shut the machine down and purge the reservoir, the pump, all the feed lines and the injectors of air. This generally requires that all the individual feed lines to the bearings be disconnected to allow the grease/air mixture to be discharged. Altogether this is a long and costly process having significant impact on machine productivity.

The invention aims to provide a method of automatically purging air from the grease pump delivery before it is distributed through the system, and preferably to also provide a single robust central monitoring point to indicate that the grease pumping system is operating correctly.

DISCLOSURE OF THE INVENTION

In a first aspect the present invention provides an apparatus for purging gas from an automatic lubrication system of the type incorporating a pump arranged to pump lubricant from a reservoir through delivery lines to one or more injectors, said apparatus including one or more gas purge valves associated with at least some of the injectors, arranged to open and dump shots of lubricant containing unacceptable levels of gas before they reach the associated injector, each gas purge valve incorporating one or more components communicating with and reactive to conditions in the pump and arranged to open the gas purge valve when abnormal pump operation is sensed due to the presence of gas in the lubricant.

In one form of the invention the pump comprises a piston pump having chambers either side of a reciprocating piston.

Preferably at least some of said components in the gas purge valve communicate with said chambers in the pump, causing the gas purge valve to open when an abnormal pressure balance is sensed between the chambers.

In one form of the invention the pump is driven by differential hydraulic pressure operating a first reciprocating piston linked by a connecting rod to a second reciprocating piston which is arranged to pump the lubricant, said chambers being located on either side of the first reciprocating piston.

Preferably a further component in the gas purge valve communicates with the lubricant delivery pressure.

In another form of the invention the reciprocating piston is arranged to contact a mechanical link when piston movement exceeds normal limits due to the presence of gas in the lubricant, the mechanical link being operable to open the gas purge valve.

Preferably the mechanical link comprises a plunger in one end of the chamber of the pump.

Preferably the delivery lines incorporate at least one chamber between the pump and the gas purge valves having a volume calculated such that the combined volume of the chamber, any unswept volume within the pump, and the volume within the delivery lines between the pump and the gas purge valves, is approximately equal to the displacement of each pump stroke.

In a further aspect the invention provides a gas purge valve for use in apparatus as disclosed above, the gas purge valve having a body enclosing a ball valve in a lubricant delivery passage passing through the body, operable by a pilot spool reciprocating in a bore to open the ball valve when abnormal pump operation is sensed and pass gas laden lubricant from the delivery passage to a dump outlet.

Preferably the dump outlet is connected to a lubricant recovery reservoir.

Preferably the pilot spool includes an annular flange dividing the bore into two areas, each communicating with the pump and arranged to move the pilot spool to open the ball valve when abnormal pump operation is sensed due the presence of gas in the lubricant.

Preferably the gas purge valve includes a position sensor arranged such that movement of a pilot spool to open the ball valve is sensed by the position sensor.

Preferably the position sensor is arranged to provide a warning signal to an operator when the gas purge valve opens.

In a still further aspect the invention provides a method of purging gas from an automatic lubrication system of the type incorporating a pump arranged to pump lubricant from a reservoir through delivery lines to one or more injectors and including one or more gas purge valves associated with at least some of the injectors, arranged to open and dump shots of lubricant containing unacceptable levels of gas before they reach the associated injector, each gas purge valve incorporating one or more components communicating with and reactive to conditions in the pump and arranged to open the gas purge valve when abnormal pump operation is sensed due to the presence of gas in the lubricant, said method comprising the steps of operating the pump to deliver lubricant to the injectors, and retrieving any gas laden lubricant dumped from the gas purge valves.

Preferably each gas purge valve incorporates a position sensor arranged to provide a warning signal to an operator when the gas purge valve opens, and the method includes the step of monitoring the warning signals from the gas purge valves to detect a malfunction in the automatic lubrication system.

BRIEF DESCRIPTION OF THE DRAWINGS

Notwithstanding any other forms that may fall within its scope, one preferred form of the invention and the variations thereof will now be described with reference to the accompanying drawings in which.

PREFERRED EMBODIMENTS OF THE INVENTION

The basic operation of different forms of automatic lubrication systems will now be described with reference to FIGS. 1 to 4.

Figure 1:
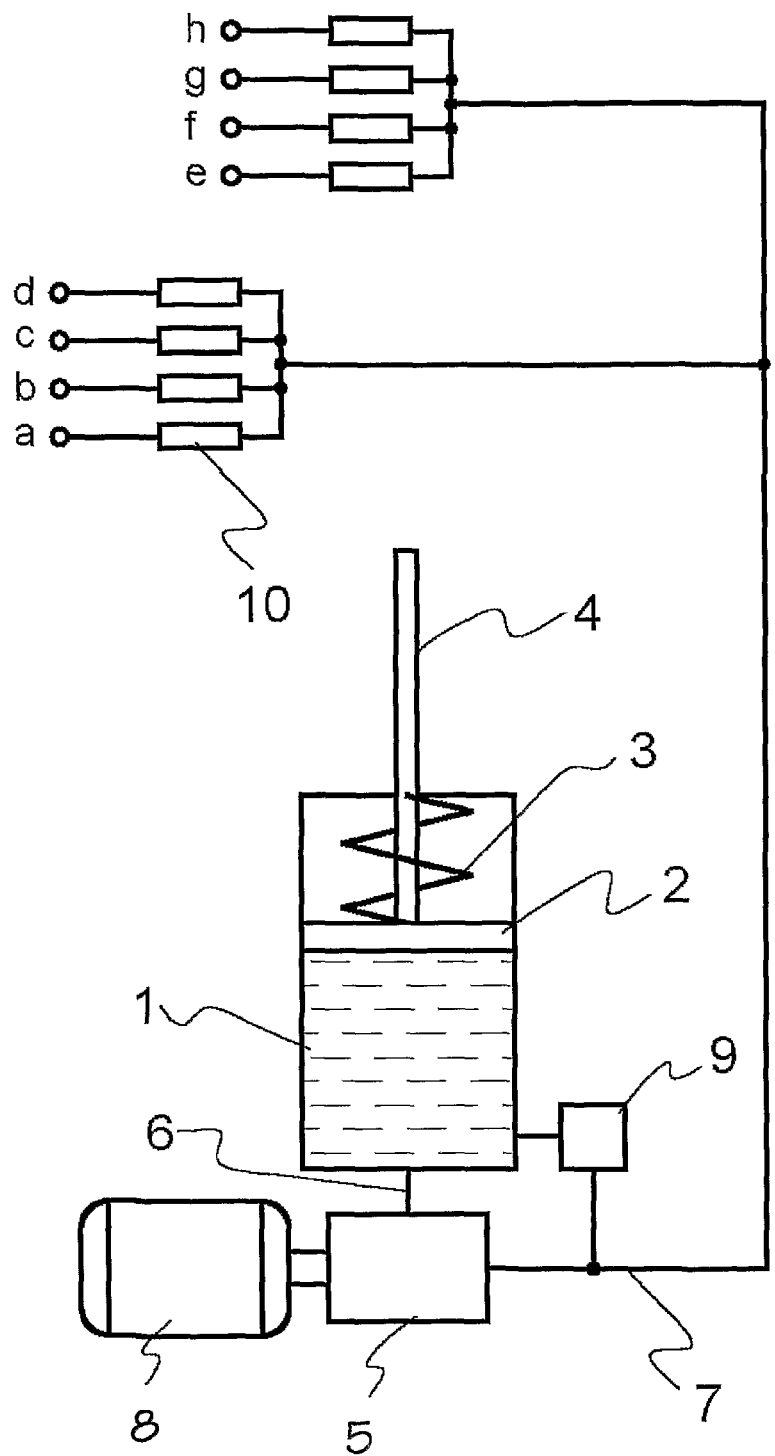
FIG. 1 is a block diagram of a basic automatic lubrication system.

FIG. 1 shows a very basic motor driven centralised lubrication system. Grease is loaded into a reservoir 1. The means for loading the grease are not shown, but would typically be by way of a drum pump driven manually, electrically or by compressed air. As the grease is loaded, follower piston 2 is pushed upwards against a spring 3. A rod 4 extends out of the top of the reservoir 1 and provides a visual indicator of the amount of grease in the reservoir.

A grease pump 5 has an inlet connection 6 and a delivery line 7. The pump can be of a simple piston type, either rotary or reciprocating, and is most commonly an automatically reciprocating piston pump powered by compressed air. Power is provided by motor 8, which may be electric, pneumatic, hydraulic or even manually powered. A vent valve 9 opens when the pump is off to relieve any pressure that might remain in the delivery line.

The delivery line is connected to any number of injectors 10, each delivering to a bearing, designated as a, b, . . . h. The injectors are a crucial part of the system as they meter a prescribed amount of grease to each bearing. Each injector can be individually adjusted to suit the requirements for the particular bearing.

The cycle of operation is set by a timer control (not shown) that turns on the grease pump 5 at predetermined intervals to provide an injection of grease into each of the bearings. At the end of each pumping cycle, the pump is turned off and the pressure in the delivery line is vented. The system is then started again after the predetermined interval. There are therefore two controls of the amount of grease delivered, being the frequency of the cycle and the adjustment of each injector. Logically the interval would be set so that the bearing requiring the most grease is satisfied with its injector set to maximum, while other bearings have their injectors set to lower settings as required.

Figure 2:
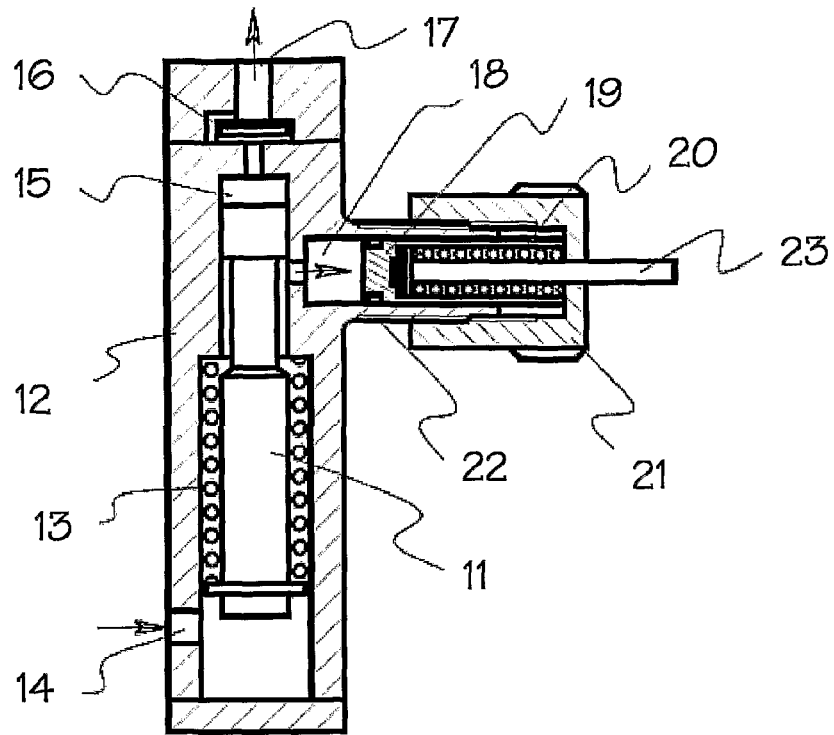
FIG. 2 is a cross-sectional view through a typical lubricant injector of the type used in FIG. 1.
Figure 3:
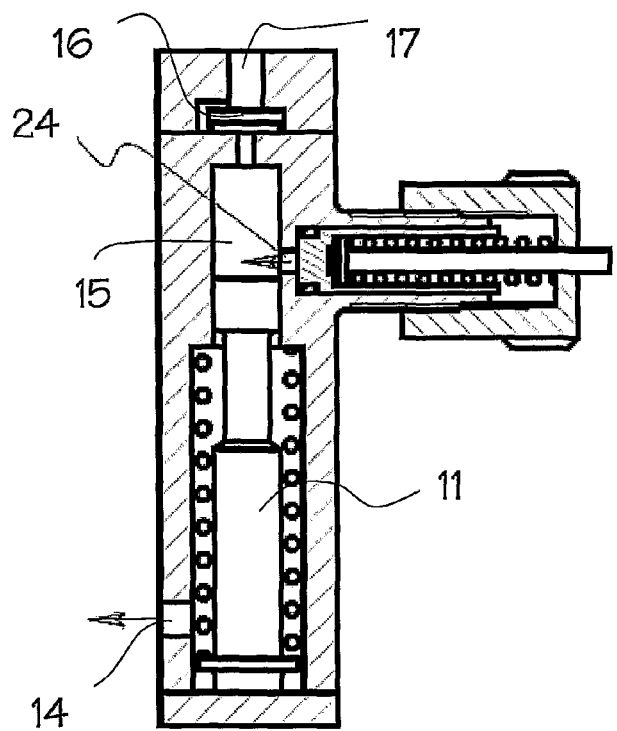
FIG. 3 is a view of the injector shown in FIG. 2 with the piston withdrawn ready for grease delivery.

FIGS. 2 and 3 show a common type of injector, with FIG. 2 showing the injection part of the operation and FIG. 3 the reset position. Referring to FIG. 2, a plunger 11 is a sliding valve fit in an injector body 12. A plunger spring 13 acts to push the plunger downwards. Grease under pressure delivered from the grease pump described in FIG. 1, entering a supply port 14 pushes the plunger upwards against the spring, forcing a charge of grease in delivery chamber 15 past outlet check valve 16 to the bearing feed line 17.

Towards the end of its travel, the plunger opens up the supply pressure to a measuring chamber 18, so that the grease under pressure pushes a measuring piston 19 against spring 20. The travel of the measuring piston is limited by the position of an adjustment cap 21, which is threaded onto an extension 22 of the injector body 12.

Indicator stem 23 provides a visual indication of the operation of the injector for checking purposes. The stem will be fully extended at the end of the injection part of the cycle, showing that the injector has successfully operated.

After the pumping part of the cycle is complete, the pressure in the supply port 14 is vented. Referring to FIG. 3, the check valve 16 closes to retain any residual pressure in the feed line 17 and prevent backflow of the grease. The plunger spring 20 forces the plunger 11 downwards, opening up the delivery chamber 15 to the measuring chamber as shown at 24. The measuring piston is forced to the left by the plunger spring 20, displacing the required amount of grease into the delivery chamber 15, ready for the next cycle.

The Indicator stem is now in its fully inwards position, showing that the injector is ready for the next shot.

Figure 4:
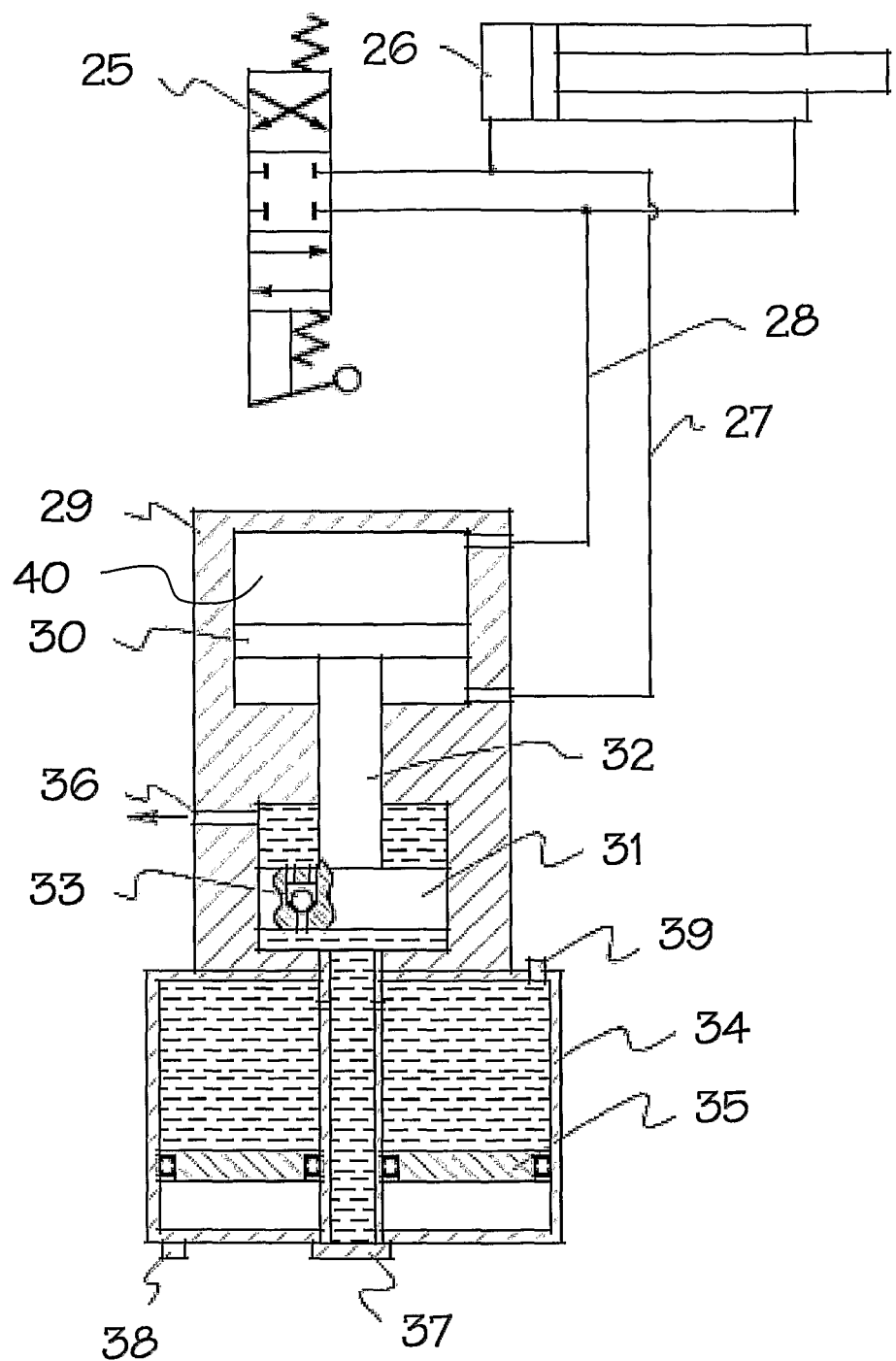
FIG. 4 is a diagrammatic cross-sectional view of a basic single shot grease delivery system.

FIG. 4 shows a diagram of a single shot system that can be used on machines that have hydraulic operation, such as mobile earth moving machinery. This system uses the hydraulic pressure generated by a machine function to provide the automatic lubrication. This has advantage in being mechanically simpler and in operating as the machine is used, whereas the timed system described above does not automatically adapt to variations in machine usage.

A part of the machine hydraulic circuit is shown, with a hydraulic directional control valve 25 operating a hydraulic cylinder 26. This cylinder could be the crowd cylinder of a hydraulic excavator, for example. As the cylinder 26 is operated during the operation of the machine, the pressures in hydraulic connections 27 and 28 alternate, and this is used to operate a grease pump, as described below.

The grease pump consists of a body 29 incorporating an oil piston 30 which is reciprocated in a chamber 40 by the alternating hydraulic pressures described above. The oil piston 30 is connected to a grease piston 31 by a connecting rod 32. The grease piston incorporates a check valve 33.

The grease pump includes a grease reservoir 34 with a follower piston 35, which may be urged upwards by a spring (not shown), in similar manner to that of the reservoir previously described in FIG. 1. A discharge port 36 is connected to as many injectors as required, again in similar manner to that shown in FIG. 1.

Operation of the directional control valve 25 to extend the hydraulic cylinder 26 causes a pressure rise in hydraulic connection 27 to the grease pump, in turn urging the piston assembly 30, 31 upwards. This will deliver grease out of the discharge port 36, while drawing fresh grease up from the reservoir 34. Subsequent reversal of the control valve 25 will cause a pressure rise in hydraulic connector 28, urging the piston assembly 30, 31 downwards. This will initially lower the pressure in the discharge line 36 and then draw fresh grease into the discharge chamber through the check valve 33. The grease pump is now reset, ready for the next shot.

FIG. 4 shows a simplified preferred design of such a single shot system, and includes a number of features that are required for its operation. A filling point 37 is provided where the reservoir may be refilled. A breather port 38 allows air to enter so that atmospheric pressure is maintained underneath the follower piston 35. An air bleed screw 39 allows any air trapped above the grease in the reservoir 34 to be removed. The arrangement as shown in FIG. 4 with the reservoir at the bottom is a preferred design in least in part because it allows the air bleed screw 39 to be at the top of the reservoir 34 and easily accessed.

A very similar design of pump can be operated by other fluid power means, hydraulic or pneumatic, to operate the grease piston 31, with the actuation then being through a timer and solenoid valve.

Turning now to FIGS. 5 to 10, it will be described below how the invention uses an air purge valve connected to the grease pump delivery line to purge air from the line to a recovery reservoir. The operation of the air purge valve is controlled by mechanisms that sense when the pressure in the delivery line is lower than design, as could be caused by aerated grease or a break in the delivery line, causing the air purge valve to open and allow the air, with some grease, to be discharged to the recovery reservoir.

An alarm can be provided to indicate when the air purge valve operates, which could typically operate a warning light visible to the machine operator. A small number of alarm indications would suggest that some air is being purged, while continuing alarm indications would suggest a more serious problem, as from a break in the delivery line. The delivery of grease is disabled during a purge cycle.

Three embodiments of the air purge valve and control mechanism are described below. It would be obvious to one skilled in the art that further variations in design are possible using the teachings of the invention.

Figure 5:
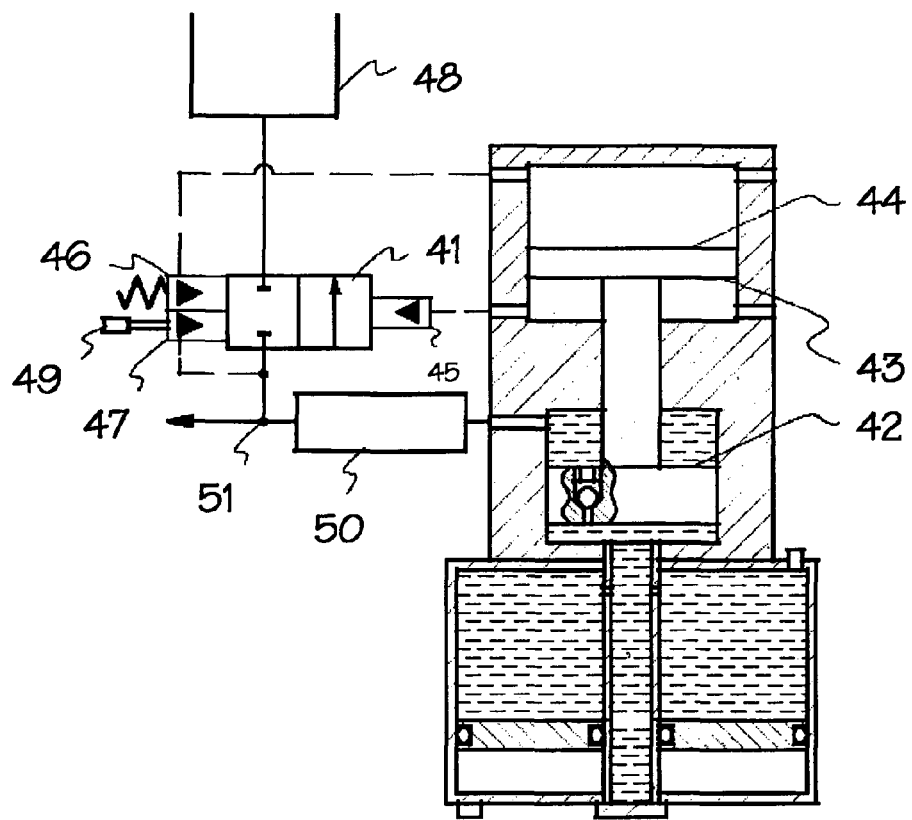
FIG. 5 is a cross-sectional view of the grease pump used in FIG. 4 with the addition of a differential pressure operated air purge valve according to the invention shown diagrammatically.

FIG. 5 shows the same basic single shot grease pump as FIG. 4 with an air purge valve 41 added in the pump delivery line.

It is a prerequisite of the invention that the upper annular area of the grease piston 42 and the lower annular area of the oil piston 43 be substantially in the same ratio as that of the working pressure in the hydraulic system to the required delivery grease pressure. In this circumstance, the upward movement of the piston assembly will come to a stop once the grease pressure has reached the design value as the force from the hydraulic system pressure acting on the area 43 under the oil piston is balanced by the force of the grease acting on the area 42 on the top of the grease piston.

This logic can be expressed in equation form as follows, also taking into account the hydraulic system return line pressure acting on the top area 44 of the oil piston:

$$Pg \times A2 = Php \times A3 - Prp \times A4$$

Where:
Pg=design grease pressure
A2=upper annular area of grease piston, P04-2
Php=working high pressure of the hydraulic system
A3=lower annular area of oil piston, P04-3
Prp=return line pressure of the hydraulic system
A4=upper area of oil piston, P-04

It will be obvious to one skilled in the art that the hydraulic working high pressure will vary with machine usage and settings, and that the delivery grease pressure can vary over a range without significantly effecting the operation of the lubrication system, particularly as the grease has very low compressibility. The specification of the design grease pressure, the design hydraulic pressures, and thus the grease pump piston area ratio, is then a matter of judgement, so that the lubrication system will operate in the manner intended over the normal usage of the machine.

A preferred embodiment of the air purge valve will be further described below with reference to FIGS. 6, 7 and 8, to demonstrate the operation of the valve 41 as shown diagrammatically in FIG. 5 where the valve 41 indicates a two way valve with three pilot areas, 45 being connected to the hydraulic system high pressure, 46 to the hydraulic system return line pressure and 47 to the delivery grease pressure.

The invention specifies that these three areas are chosen so that the valve will stay closed if the grease pump is successfully creating the design pressure. This logic can be expressed in equation form as follows:

$$\text{Valve closed if } (Pg \times A7 + Prp \times A6 > Php \times A5)$$

Where:
Pg=design grease pressure
A7=valve end area holding valve closed, P04-7
Prp=return line pressure of the hydraulic system A6=valve end area holding valve closed, P04-6
Php=working high pressure of the hydraulic system
A5=valve end area urging the valve open, P-05

Again it will be obvious to one skilled in the art that the selection of the design operating pressures, and thus the area ratios of the valve, are a matter of judgement, so that the air purging valve will operate in the manner intended over the normal usage of the machine and lubrication system.

If there is a bubble of air in the grease in the reservoir, it will be drawn through the check valve in the grease piston and into the delivery chamber. During the suction stroke with the piston assembly moving downwards, the pressure in the delivery chamber is slightly below the essentially atmospheric pressure in the reservoir, so the bubble will increase in volume. The subsequent delivery stroke with the piston moving upwards, will have a lower rate of pressure rise than normal. If the bubble is large enough, the pump will reach the end of its stroke before the design grease pressure is achieved. However the hydraulic high pressure will have reached its design value, so the requirements to hold the air purge valve closed are not met and it will open to allow a mixture of grease and air to discharge into the recovery reservoir 48.

When the air bubble has been purged, the performance of the pump will return to normal and provide the required lubricant flow to the injectors.

The valve also incorporates a position sensor 49 which reacts to the opening of the valve to give a malfunction alert to the machine operator, by way of a warning light or similar. With a modest amount of air the light might come on for a few machine cycles before the pump reverts to normal operation. The alarm system also reacts to an empty reservoir or to a break in the feed leading to a loss of grease pressure, so that, despite its simplicity, it covers the most common failure scenarios of such a lubrication system.

Proper operation of the invention requires that the volume between the pump and the air purge valve is sufficient to maximise the amount of air that is purged while being small enough to minimise the amount of grease that accompanies the air to the recovery reservoir. This is achieved by the inclusion of a compressibility chamber 50 between the pump and the junction 51 to the air purge valve. In practice, the combined volume of the chamber with 50 with any unswept volume within the grease pump and of any volume in the connecting lines between the grease pump and junction 51 should substantially equal the displacement of each grease pump stroke.

Figure 6:
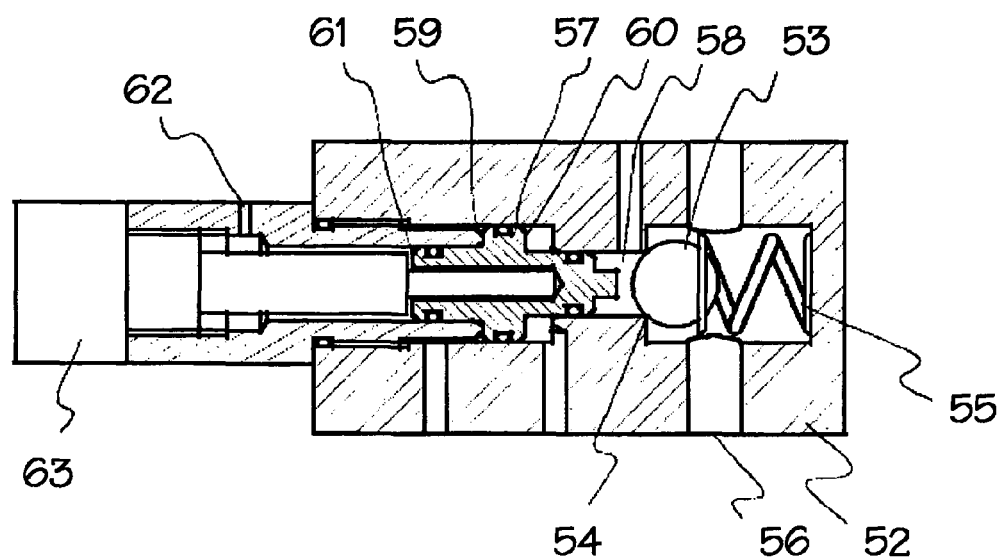
FIG. 6 is a cross-sectional view through a preferred form of hydraulically operated air purge valve according to the invention with a pilot spool in a ready for action position.
Figure 7:
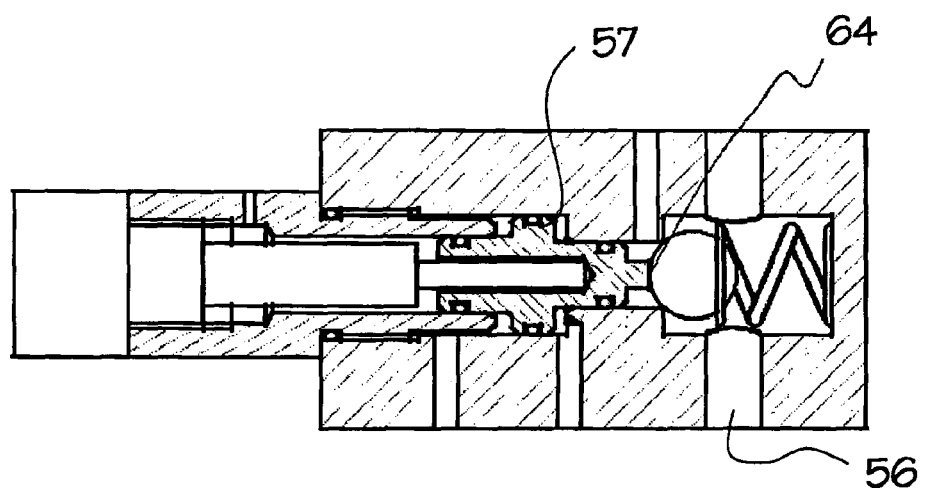
FIG. 7 is a view similar to FIG. 6 showing the pilot spool position during a normal grease pumping operation.

Turning now to the actual operation of the preferred form of hydraulically operated air purge valve, FIG. 6 shows a preferred embodiment of the air purge valve. It consists of a body 52, enclosing a ball valve 53 that is urged against a sealing seat 54 by a spring 55. The area of the seat is equivalent to A7 in the valve equation above. The ball valve 53 seals off the grease pressure in the delivery line 56 unless it is forced off its seat by the action of a pilot spool 57, in which case the grease can pass across the ball valve seat 54 to outlet 58 which is connected to the recovery reservoir 48.

The pilot spool 57 has an annular area 59 connected to the hydraulic system high pressure as at 45, equivalent to A5, and a second annular area 60 connected to the hydraulic system return line pressure as at 46, equivalent to A6. The outer end 61 of the spool is vented to atmosphere through drilling 62.

If in operation the force from the hydraulic high pressure at 45 acting on 59 exceeds the combined forces from the hydraulic return pressure 46 acting on 60, grease pressure acting on area 54 and the relatively light spring load, the ball valve will be forced open, thus purging air laden grease through outlet 58.

A position sensor 63 provides a warning signal when the pilot spool 57 moves to the right to open the ball valve 53.

FIG. 6 shows the position of the pilot spool 57 in the ready for action position, while the grease pump is inactive. FIG. 7 shows the pilot spool 57 position during a normal pumping operation without excessive air present, so that the grease pressure in the delivery line 56 is sufficient to hold the ball valve 53 closed. FIG. 8 shows the pilot spool position when the grease pressure in the delivery line 56 is too low, indicating that the pump has reached its full stroke without generating the necessary pressure, with the ball valve open as indicated at 65.

Figure 9:
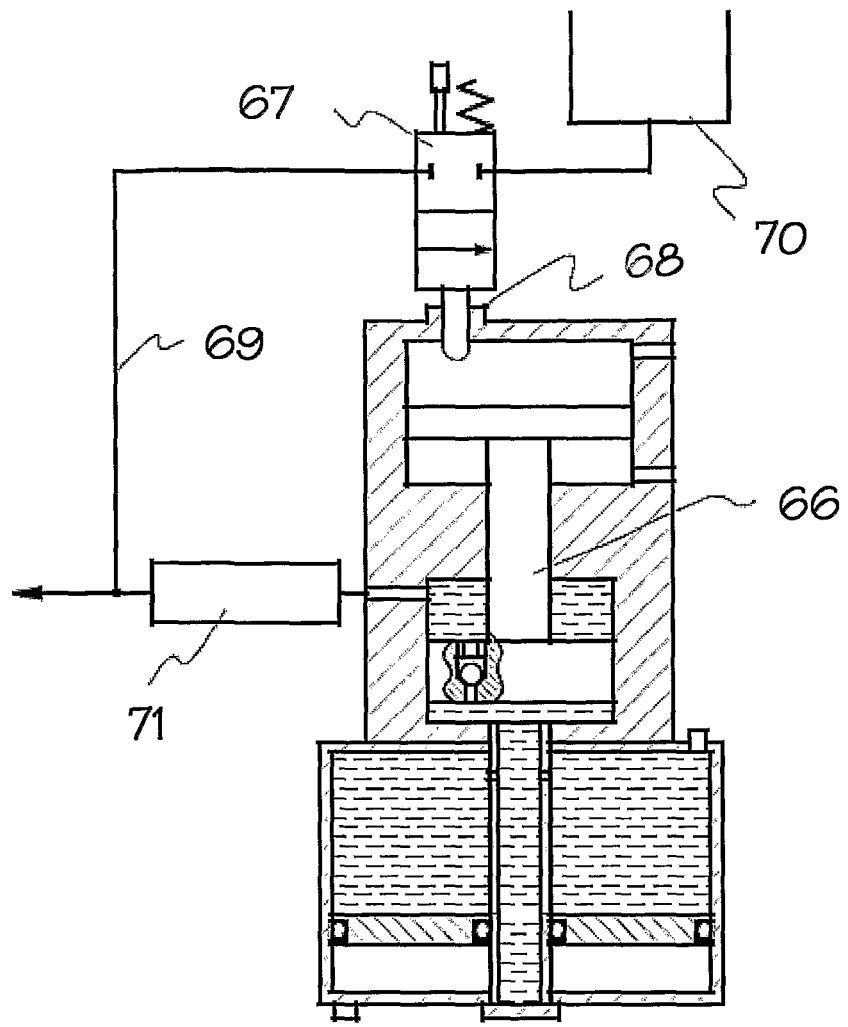
FIG. 9 is a cross-sectional view through a grease pump of the general type shown in FIG. 4 with the addition of a mechanically operated air purge valve according to the invention.

Another embodiment of the invention uses a valve that is mechanically operated by excess movement of the pump piston assembly, as shown in FIG. 9. The piston assembly 66 is configured in the manner previously described so that the design grease pressure is normally reached before the assembly travels its full possible distance, as the areas of the piston assembly are selected so that the assembly reaches equilibrium before the full travel occurs.

However, if the grease is aerated the piston assembly 66 will travel further and then operate an air purge valve 67 by way of plunger 68, thus connecting the delivery line 69 to the recovery reservoir 70. The requirement for compressibility volume between the pump and the junction to the purge valve is the same as with the previous embodiment and illustrated by the chamber 71.

This embodiment shows the plunger 68 operated by the oil piston, but it could be operated by the grease piston, or by an extension of the connecting rod, depending on the details of construction of the pump.

Figure 8:
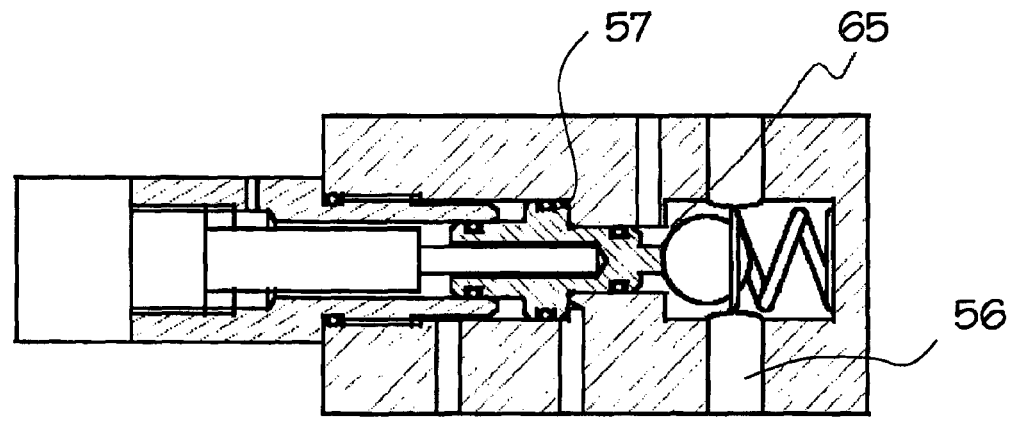
FIG. 8 is a view similar to FIG. 6 showing the pilot spool position when air is present operating to open the valve.

The construction of the air purge valve could be similar to that shown in FIG. 8 except in that the ball will be lifted off its seat by the plunger 68, instead of by the pilot spool 57 (FIG. 6).

Both the embodiment shown in FIGS. 6 to 8 and the embodiment shown in FIG. 9 as applied to a single shot pump are described with reference to a pump operated by hydraulic pressure from a commonly used function in the machine's hydraulic system as shown in FIG. 4. In both cases the embodiments can be applied to a single shot pump operated by hydraulic or pneumatic means supplied through a solenoid valve operated by a timer or similar control. The areas of the pistons, and in the valve for the first embodiment, are chosen to suit the design grease pressure and the pressure of the actuation means to have the ratios described in the equations above.

Figure 10:
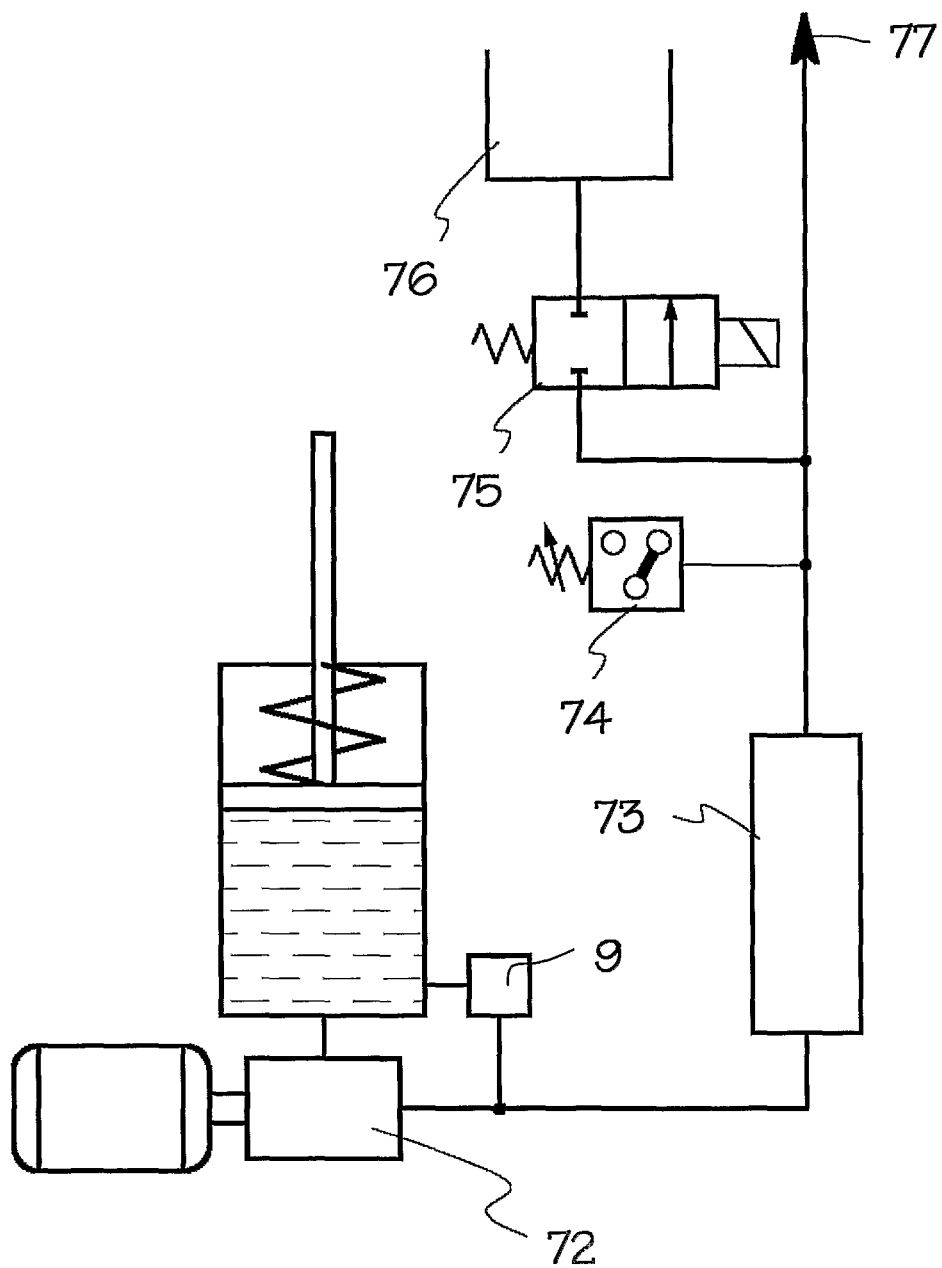
FIG. 10 is a diagrammatic view of a solenoid operated air purge valve according to the invention incorporated in a grease pump system.

The two embodiments described above are intended for use in single shot grease pump systems. The application of the invention to greasing systems using a timed grease pump, as described with reference to FIG. 1, is possible using a solenoid operated air purge valve, as illustrated in FIG. 10.

The delivery line of a grease pump 72, (as described at 5 in relation to FIG. 1), passes through a compressibility volume in a chamber 73 to a connection to a pressure switch or transducer and solenoid valve 74. The delivery line continues to the injectors (not shown) as indicated by the arrow 77. The solenoid valve discharges to a recovery reservoir 76, as with the previous embodiments.

The solenoid valve can be of normal construction, as used in the control of high pressure oil systems.

In this system the amount of grease pumped each cycle is set by the displacement of the pump and a prescribed period of operation. Under normal conditions the design grease pressure is achieved in the normal operation time, but with aerated grease only a lower pressure will be achieved. If the pressure switch setting is not reached when the normal operation time is completed the vent valve 9 remains closed, and the solenoid air purge valve 75 is opened and then remains open for either a set period of time or until the next cycle commences, to allow the air laden grease to purge out of the delivery line.

An alternative control would be to run the pump until the pressure switch 74 senses that the design pressure has been achieved. Under normal circumstances this will take a prescribed length of time, but this time will be exceeded if the grease is aerated, and this failure to meet the design pressure within the prescribed time can be used to operate the solenoid valve.

The invention claimed is:

1. An apparatus for purging gas from an automatic lubrication system of the type incorporating a pump arranged to pump lubricant from a reservoir through delivery lines to one or more injectors, comprising:
   one or more gas purge valves associated with at least some of the injectors, arranged to open and dump shots of lubricant containing unacceptable levels of gas before they reach the associated injector, each gas purge valve incorporating one or more components communicating with and reactive to conditions in the pump and arranged to open the gas purge valve when abnormal pump operation is sensed due to the presence of gas in the lubricant;
   wherein the pump comprises a piston pump having chambers either side of a Reciprocating piston; and
   wherein at least some of said components in the gas purge valve communicate with Said chambers in the pump, causing the gas purge valve to open when an abnormal pressure Balance is sensed between the chambers.

2. Apparatus as claimed in claim 1 wherein the pump is configured to achieve a prescribed pressure within a prescribed time under normal conditions.

3. Apparatus as claimed in claim 2 wherein a pressure sensor detects a failure to achieve said prescribed pressure and opens the purge valve to discharge gas-laden lubricant.

4. Apparatus as claimed in claim 1 wherein the pump is a single stroke piston pump configured to achieve a prescribed pressure within the limiting stroke of the pump piston under normal conditions.

5. Apparatus as claimed in claim 1 wherein the pump is driven by differential hydraulic pressure operating a first reciprocating piston operating in a cylinder forming chambers on either side of said first piston, said first piston being linked by a connecting rod to a second reciprocating piston which is arranged to pump the lubricant.

6. Apparatus as claimed in claim 5 wherein the purge valve is caused to operate by abnormal pressures in said chambers.

7. Apparatus as claimed in claim 6 wherein the purge valve is connected to the pressures through a conduit on both of said chambers and to the lubricant pressure generated by the pump, so that the difference of the pressures in said chambers causes the purge valve to open when said lubricant pressure is abnormally low.

8. A gas purge valve for use in apparatus as claimed in claim 7, the gas purge valve having a body enclosing a ball valve in a lubricant delivery passage passing through the body, operable by a pilot spool reciprocating in a bore to open the ball valve and pass gas laden lubricant from the delivery passage to a dump outlet.

9. A gas purge valve as claimed in claim 6 wherein a pilot spool includes an annular flange dividing the bore into two areas, each communicating with said chambers and arranged to move the pilot spool to open the ball valve due the presence of gas in the lubricant, wherein the size of said areas, in conjunction with the effective area of said ball valve, defines the pressure condition at which the purge valve opens.

10. Apparatus as claimed in claim 1 wherein the purge valve incorporates a position sensor arranged so that opening of the valve activates the sensor.

11. Apparatus as claimed in claim 1 wherein the pressure switch also provides a warning signal to the machine operator when the purge valve opens, and provides a signal to the lubrication monitoring system.

12. Apparatus as claimed in claim 1 wherein the delivery lines incorporate at least one chamber between the pump and the gas purge valves having a volume calculated such that the combined volume of the chamber, any unswept volume within the pump, and the volume within the delivery lines between the pump and the gas purge valves, is approximately equal to the displacement of the prescribed pump delivery.

13. Apparatus as claimed in claim 1 wherein the outlet of the purge valve, or dump outlet, is connected to a lubricant recovery reservoir.

14. Apparatus as claimed in claim 1 wherein the pump is driven by differential hydraulic pressure operating a first reciprocating piston linked by a connecting rod to a second reciprocating piston which is arranged to pump the lubricant, said chambers being located on either side of the first reciprocating piston.

15. Apparatus as claimed in claim 1, wherein a further component in the gas purge valve communicates with the lubricant delivery pressure.

16. Apparatus as claimed in claim 1, wherein the delivery lines incorporate at least one chamber between the pump and the gas purge valves having a volume calculated such that the combined volume of the chamber, any unswept volume within the pump, and the volume within the delivery lines between the pump and the gas purge valves, is approximately equal to the displacement of each pump stroke.

17. A gas purge valve for use in apparatus as claimed in claim 1, the gas purge valve having a body enclosing a ball valve in a lubricant delivery passage passing through the body, operable by a pilot spool reciprocating in a bore to open the ball valve and pass gas laiden lubricant from the delivery passage to a dump outlet.

18. A gas purge valve as claimed in claim 17 wherein the dump outlet is connected to a lubricant recovery reservoir.

19. A gas purge valve as claimed in claim 17 wherein the pilot spool includes an annular flange dividing the bore into two areas, each communicating with the pump and arranged to move the pilot spool to open the ball valve due the presence of gas in the lubricant.

20. A gas purge valve as claimed in claim 17 including a position sensor arranged such that movement of a pilot spool to open the ball valve is sensed by the position sensor.

21. A gas purge valve as claimed in claim 20 wherein the position sensor is arranged to provide a warning signal to an operator when the gas purge valve opens.

* * * * *